United States Patent [19]

Faulkner

[11] Patent Number: 5,341,640
[45] Date of Patent: Aug. 30, 1994

[54] TURBOJET ENGINE WITH AFTERBURNER AND THRUST AUGMENTATION EJECTORS

[76] Inventor: Robie L. Faulkner, P.O. Box 1630, Alpine, Calif. 91903

[21] Appl. No.: 40,355

[22] Filed: Mar. 30, 1993

[51] Int. Cl.$^5$ .................... F02K 1/46; F02K 3/10
[52] U.S. Cl. ........................ 60/251; 60/261; 60/262; 60/269
[58] Field of Search ............... 60/261, 262, 263, 269, 60/224, 225, 246, 250, 251

[56] References Cited

U.S. PATENT DOCUMENTS

| 1,375,601 | 4/1921 | Morize | 60/269 |
|---|---|---|---|
| 2,641,902 | 6/1953 | Kerr | 60/261 |
| 2,654,215 | 10/1953 | Thompson | 60/261 |
| 2,825,204 | 3/1958 | Kadosch et al. | 60/263 |
| 2,882,679 | 4/1959 | Karcher et al. | 60/261 |
| 3,176,462 | 4/1965 | Eckert | 60/262 |
| 4,592,202 | 6/1986 | Stewart et al. | 60/269 |
| 4,644,746 | 2/1987 | Hartman | 60/269 |
| 4,896,501 | 1/1990 | Faulkner | 60/261 |

FOREIGN PATENT DOCUMENTS

| 2025399 | 9/1978 | Fed. Rep. of Germany | 60/261 |
|---|---|---|---|
| 812317 | 4/1959 | United Kingdom | 60/263 |

OTHER PUBLICATIONS

Dietz, Robert O. "Ducted Rocket Promises Better Range, Speed, Payload"; Aviation Age R&D Handbook, Tullhoma, Tenn. 1959, p. D-6.

Primary Examiner—Louis J. Casaregola
Attorney, Agent, or Firm—Calif Tervo

[57] ABSTRACT

A thrust propulsion unit for an aircraft comprises an engine, such as a turbojet engine with afterburner or a rocket engine, capable of producing thrust by expulsion of hot gases at near sonic or greater velocity through a nozzle portal and a primary ejector connected to the engine comprising a primary air intake for directing ambient air to an intake end of a primary ejector duct and a primary ejector duct having a lateral cross sectional area greater than the nozzle portal. The primary ejector duct receives the gases expelled from the engine portal and the air from the primary air intake and expels them out an exhaust end with increased momentum. An auxiliary ejector may be provided including an auxiliary air intake for directing ambient air to an intake end of an auxiliary ejector duct and an auxiliary ejector duct having a lateral cross sectional area greater than the lateral cross section of the primary ejector duct, an intake end disposed to receive the gases expelled from the exhaust end of the primary ejector duct and the air from the auxiliary air intake and an exhaust end which may flare to form a diffuser. An ejector duct may include a flame holder assembly including ignitor and atomizer.

15 Claims, 1 Drawing Sheet

TURBOJET ENGINE WITH AFTERBURNER AND THRUST AUGMENTATION EJECTORS

BACKGROUND OF THE INVENTION

This invention relates in general to a thrust enhancer for use in a jet or rocket engine aircraft, particularly for use in lower thrust applications, such as in takeoff of missiles and light aircraft, where additional thrust from a lightweight and compact augmentation system is very desirable. The thrust enhancer is particularly suited for augmenting the thrust of engines that expel gases at near sonic or greater velocities.

Jet engines and rockets produce thrust by expelling burned gasses at high velocity. My previous U.S. Pat. No. 4,896,501 titled "TURBOJET ENGINE WITH SONIC INJECTION AFTERBURNER" describes a particular turbojet engine in which fuel is supplied to the afterburner by spraying it into several small turbine bypass ducts which connect the main combustion chamber to the forward portion of the afterburner. The hot gas and fuel mixture is expelled from the bypass ducts as sonic velocity jets because of the relative high pressure drop between the main combustion chamber and the afterburner. The sonic jets are directed into the afterburner in a tangential manner and mix with the turbine discharge.

The tangential entry of the jets creates a fuel-rich vortex stabilization mechanism in the forward portion of the afterburner duct. Flame speed is increased in this hot jet inducted vortex and combustion time is shortened. As a result, the afterburner duct can be shortened. The afterburner terminates in a restrictive nozzle such that the burnt gasses exit at near sonic or greater velocities.

SUMMARY OF THE INVENTION

A thrust propulsion unit for an aircraft comprises an engine, such as a turbojet engine with an afterburner or a rocket engine, capable of producing thrust by expulsion of hot gases at sonic or near sonic velocity through a nozzle portal and a primary ejector connected to the engine comprising a primary air intake for directing ambient air to an intake end of a primary ejector duct and a primary ejector duct having a lateral cross sectional area greater than the nozzle portal. The primary ejector duct receives the gases expelled from the engine portal and the air from the primary air intake and expels them out an exhaust end.

An auxiliary ejector may be provided including an auxiliary air intake for directing ambient air to an intake end of an auxiliary ejector duct and an auxiliary ejector duct having a lateral cross sectional area greater than the lateral cross section of the primary ejector duct, an intake end disposed to receive the gases expelled from the exhaust end of the primary ejector duct and the air from the auxiliary air intake and an exhaust end which may flare to form a diffuser. An ejector duct may include a flame holder assembly.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
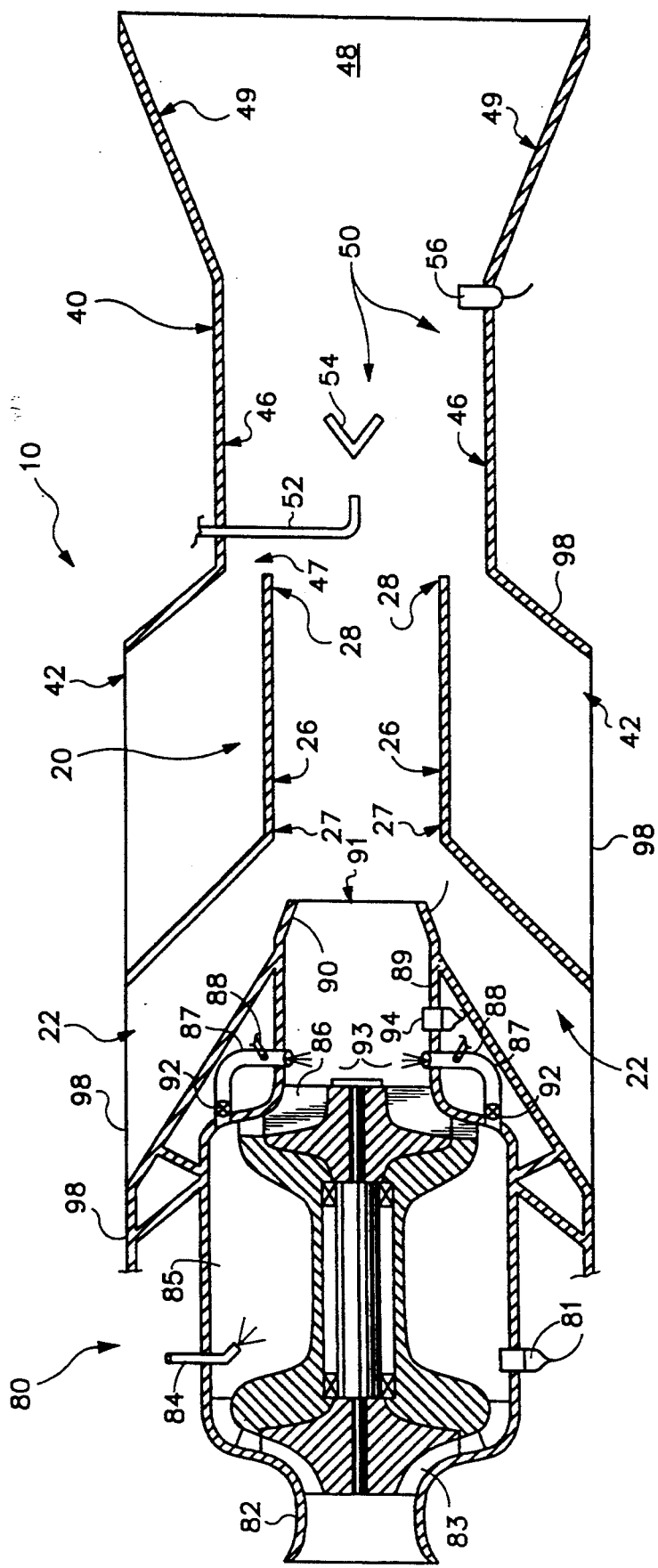
FIG. 1 is a cross-sectional side view of an after-burning turbojet engine incorporating an exemplary embodiment of the thrust enhancer of the invention.

With reference now to FIG. 1 of the drawing, there is shown in cross-sectional side view of a thrust propulsion unit for an aircraft including an after-burning turbojet engine, denoted generally as 80, and an exemplary embodiment of a thrust enhancing system, denoted generally as 10. A body structure or frame 98 connects these elements and holds them in position relative to one another.

Turbojet engine 80 generally includes an inlet duct 82, a compressor 83, a main combustion chamber 85, main combustion chamber fuel injectors 84, a main ignitor 81, a turbine 86, turbine bypass ducts 87, afterburner fuel injectors 88, afterburner duct 89, afterburner exit nozzle 90, turbine bypass duct control valves 92, and afterburner ignitor 94.

Main combustion chamber 85 is connected between compressor 83 and turbine 86 and uses conventional ignitor 81 and fuel injectors 84. Turbine bypass ducts 87 are connected between main combustion chamber 85 and afterburner duct 89. The afterburner fuel is sprayed into turbine bypass ducts 87 through afterburner fuel injectors 88. The hot main combustion chamber gas and fuel air mixture discharges from turbine bypass ducts 87 into afterburner duct 89 in the form of high velocity or supersonic velocity tangential jets 93 where it mixes with discharge gas from turbine 86. A portion of the oxygen in the gas exiting main combustion chamber 85 thru turbine 86 and bypass ducts 87 supports combustion of the fuel in afterburner 89. The level of fuel/air ratio in afterburner duct 89 is dependent upon the amount of thrust required and the oxygen concentration of the gas leaving combustion chamber 85 thru turbine 86 and bypass ducts 87. Conventionally, fuel addition is controlled by the available oxygen concentration to obtain complete combustion. However, this invention allows for addition of additional fuel above that required for complete combustion and these fuel-rich gasses pass through nozzle 90 to continue burning in the primary and auxiliary ducts for additional thrust.

The tangential entry of high or supersonic velocity jets 93 which contain hot gas products and fuel air mixture creates a fuel-rich vortex stabilization mechanism in the forward portion of afterburner duct 89. The flame speed is enhanced in the hot jet induced vortex. As a result, the length of afterburner duct 89 required to mix and complete the combustion process prior to discharge through exit nozzle 90 is reduced. The high or supersonic velocity jets 93 created by two turbine bypass ducts 87 can be arranged opposite each other on afterburner duct 89, jets 93 from each enters opposite one another to form opposed jets 93 in main afterburner duct 89. The impingement of the jets forms a bluff body afterburner flame stabilizing mechanism which allows the combustion process to be completed prior to discharge through exit nozzle 10. Some applications may require an afterburner ignitor 94, a full or partial flame holder in duct 89 and control valves 92 in turbine bypass ducts 87. Some applications will have sufficiently high gas temperatures in turbine exhaust or turbine bypass ducts 87 to ignite the fuel air mixture, but other applications will require that some or all of the afterburner fuel be added within the afterburner duct 89 through conventional turbojet afterburner fuel spray rings located upstream of turbine bypass ducts 87 which discharge into afterburner duct 89. The fuel is then burnt in the vortex stabilization region formed by the tangential entry of high or supersonic velocity jets 93 into afterburner duct 89. Some applications may require that the fuel sprayed through conventional afterburner spray rings in afterburner duct 89 be burnt using a bluff body flame stabilization mechanism. This is created by the discharge of the two turbine bypass ducts into afterburner duct 89 where each enters opposite one another.

Thrust enhancing system 10 generally includes a primary ejector, denoted generally as 20, and an auxiliary ejector, denoted generally as 40, but additional ejector stages may be used.

Primary ejector 20 is connected by frame 98 to engine 80. Primary ejector 20 generally includes primary air intake means, including primary air intake 22, and primary ejector duct 26.

Primary air intake means, including primary air intake 22, is connected to engine 80 for directing ambient air to intake end 27 of primary ejector duct 26. Preferably, the air drawn thru primary air intake 22 is directed over the outside aft surface of afterburner nozzle 90 and is of sufficient velocity as to provide outside aft surface cooling of nozzle 90.

Primary ejector duct 26, connected to engine 80, has a lateral cross sectional area greater than that of the orifice or portal 91 of afterburner nozzle 90. Primary ejector duct 26 generally comprises intake end 27, disposed to receive the gases expelled from afterburner portal 91 and the air from primary air intake 22, and exhaust end 28 for expelling combined the gases and air received by intake end 27.

The high velocity exhaust jet exits from portal 91 of nozzle 90 into primary ejector duct intake 27 and duct 26 and, in so doing, entrains secondary air which is drawn through primary air intake 22. Mixing continues between the afterburner discharge jet and the primary intake air as it passes through primary ejector duct 26. The momentum efflux is increased above that of the afterburner discharge jet alone resulting in a thrust increase. According to an embodiment of the invention, the exhaust from primary ejector 20 may be expelled directly from the aircraft to provide thrust to the aircraft. However, in the exemplary embodiment shown the output of primary ejector 20 is input into auxiliary ejector 40 for further thrust enhancing.

Auxiliary ejector 40 is connected by frame 98 to engine 80. Auxiliary ejector 40 generally comprises auxiliary air intake means, including auxiliary air intake 42, auxiliary ejector duct 46, and a flame holder assembly.

Auxiliary ejector duct 46, connected by frame 98 to engine 80, has a lateral cross sectional area greater than that of exit end 28 of the primary ejector duct from which it receives exhaust. Auxiliary ejector duct 46 generally comprises intake end 47, disposed to receive the gases expelled from primary duct 26 and the air from auxiliary air intake 42, and exhaust end 48 which may flare to form diffuser 49.

Auxiliary air intake means, such as auxiliary air intake 42, is connected by frame 98 to engine 80 for directing ambient air to intake end 47 of auxiliary ejector duct 46. Intake air mixes along auxiliary duct 46 with gas flow exiting primary ejector duct 26 and discharging into intake 47.

Auxiliary injector duct 46 may include a flame holder assembly, mounted therein. The flame holder assembly is of common type, well-known in the art, and generally comprises upstream atomizer 52 for spraying fuel, V-gutter 54 for flame holding the burning fuel-air mixture, and ignitor 56. At this point, the oxygen from air intakes 22,42 can support combustion of additional fuel form the atomizer to create additional heat release to provide additional thrust. Exit diffuser 19 at the end of the secondary ejector enhances thrust augmentation performance by increasing the entrained flow which increases the resultant thrust.

Thrust enhancing system 10 may be of very light materials and may be jettisoned after liftoff. Also, a multiplicity of ejector stages comprised of one or more primary and/or auxiliary ejectors may be used.

The single or multiple ejector stages may contain fuel atomizers, flame holders and ignitors to provide additional heat release and resulting velocity increase in each stage for thrust increase.

Another method of increasing thrust of the system is by flowing additional fuel through the afterburner fuel atomizers in an amount greater than can completely combine with the oxygen remaining in the gasses flowing through bypass ducts 87 and turbine 86. These fuel-rich gasses can burn in the primary ejector 20 or in auxiliary ejectors. The afterburner of engine 80 may contain a conventional atomizer and V-gutter assembly.

Having described the invention, it can be seen that it provides a very efficient device for thrust augmentation.

Although a particular embodiment of the invention has been illustrated and described, various changes may be made in the form, composition, construction, and arrangement of the parts without sacrificing any of its advantages. Therefore, it is to be understood that all matter herein is to be interpreted and illustrative and not in any limiting sense and it is intended to cover in the appended claims such modifications as come within the true spirit and scope of the invention.

I claim:

1. A thrust propulsion unit for an aircraft comprising:
   an engine capable of producing thrust by expulsion of hot gases at near sonic or greater velocity through a portal;
   said engine being a turbojet engine having an afterburner; and
   an ejector connected to said engine comprising:
      air intake means connected to said engine for directing ambient air to an intake end of a duct;
      a duct, connected to said engine and having a lateral cross sectional area greater than said portal, comprising:
         an intake end disposed to receive the gases expelled from said engine portal and the air from said air intake means;
         a flame holder assembly mounted in said duct in the combined flow of the gasses expelled by said engine and the air from said intake means for combustion of the combined flow; and
         an exhaust end for expelling combined the burned gases and air received by said intake end, such that the momentum of the gasses and air exiting said exhaust end is greater than the momentum of the gasses expelled from said engine portal.
2. The propulsion unit of claim 1 wherein:

said air intake means directs intake air over the outside aft surface of said afterburner.

3. A thrust propulsion unit for an aircraft comprising:

an engine capable of producing thrust by expulsion of hot gases at or near sonic or greater velocity through a portal; and a primary ejector connected to said engine comprising:

primary air intake means connected to said engine for directing ambient air to an intake end of a primary ejector duct;

a primary ejector duct, connected to said engine and having a lateral cross sectional area greater than said portal, comprising:

an intake end disposed to receive the gases expelled from said engine portal and the air from said primary air intake means; and an exhaust end for expelling combined the gases and air received by said intake end; and an auxiliary ejector connected to said engine comprising:

auxiliary air intake means connected to said engine for directing ambient air to an intake end of an auxiliary ejector duct;

an auxiliary ejector duct, connected to said engine and having a lateral cross sectional area greater than the lateral cross section of said primary ejector duct, comprising:

an intake end disposed to receive the gases expelled from said exhaust end of said primary ejector duct and the air from said auxiliary air intake means;

a flame holder assembly mounted in said auxiliary ejector duct in the combined flow of the gasses expelled by said engine and the air from said intake means for combustion of the combined flow; and a exhaust end for expelling combined the burned gases and air received by said intake end of said auxiliary ejector duct, such that the momentum of the burned gasses and air exiting said exhaust end of said auxiliary duct is greater than the momentum of the gasses expelled from said engine portal.

4. The propulsion unit of claim 3 wherein:

said exhaust end of said auxiliary ejector duct flares to form a diffuser.

5. The propulsion unit of claim 3 wherein:

said engine includes a fuel insector for adding fuel to the hot gasses to be expelled through said portal such that the gasses expelled from said engine portal are fuel-rich.

6. The propulsion unit of claim 3 wherein:

said engine is a rocket engine.

7. The propulsion unit of claim 3 wherein:

said engine is a turbojet engine having an afterburner.

8. The propulsion unit of claim 7 wherein:

said primary air intake means directs intake air over the outside aft surface of said afterburner.

9. A thrust enhancer for a turbojet engine of the type having a combustion chamber, a turbine for receiving hot gases from said combustion chamber, an afterburner duct connected to the output of said turbine for receiving turbine discharge gas, a turbine bypass duct connecting said combustion chamber with said afterburner duct for receiving hot combustion chamber gasses from said combustion chamber and for tangentially injecting the received hot gasses at high speed into said afterburner duct such that a flame stabilizing vortex is created of the injected gasses and the received turbine discharge gas, said afterburner duct including a nozzle out of which the hot gases are expelled at near sonic or greater velocity, said thrust enhancer comprising:

an ejector connected to said engine comprising:

air intake means connected to said engine for directing ambient air to an intake end of a duct;

a duct, connected to said engine and having a lateral cross sectional area greater than said afterburner nozzle, comprising:

an intake end disposed to receive the gases expelled from said afterburner nozzle and the air from said air intake means;

a flame holder assembly mounted in said duct in the combined flow of the gasses expelled by said engine and the air from said intake means for combustion of the combined flow: and an exhaust end for expelling combined the burned gases and air received by said intake end, such that the momentum of the burned gasses and air exiting said exhaust end of said auxiliary duct is greater than the momentum of the gasses expelled from said engine portal.

10. The thrust enhance of claim 9 wherein:

said exhaust end of said duct flares to form a diffuser.

11. The thrust enhancer of claim 9 wherein:

said air intake means directs intake air over the outside aft surface of said afterburner.

12. A thrust enhancer for a turbojet engine of the type having a combustion chamber, a turbine for receiving hot gases from said combustion chamber, an afterburner duct connected to the output of said turbine for receiving turbine discharge gas, a turbine bypass duct connecting said combustion chamber with said afterburner duct for receiving hot combustion chamber gasses from said combustion chamber and for tangentially injecting the received hot gasses at high speed into said afterburner duct such that a flame stabilizing vortex is created of the injected gasses and the received turbine discharge gas, said afterburner duct including a nozzle out of which the hot gases are expelled at near sonic or greater velocity, said thrust enhancer comprising:

a primary ejector connected to said engine comprising:

primary air intake means connected to said engine for directing ambient air to an intake end of a primary ejector duct;

a primary ejector duct, connected to said engine and having a lateral cross sectional area greater than said afterburner nozzle, comprising:

an intake end disposed to receive the gases expelled from said afterburner nozzle and the air from said primary air intake means; and an exhaust end for expelling combined the gases and air received by said intake end; and an auxiliary ejector connected to said engine comprising:

auxiliary air intake means connected to said engine for directing ambient air to an intake end of an auxiliary ejector duct;

an auxiliary ejector duct, connected to said engine and having a lateral cross sectional area greater than the lateral cross section of said primary ejector duct, comprising:

an intake end disposed to receive the gases expelled from said exhaust end of said primary ejector duct and the air from said auxiliary air intake means; and a exhaust end for expelling combined the gases and air received by said intake end of said auxiliary ejector duct, such that the momentum of the gasses and air exiting said exhaust end of said auxiliary duct is greater than the momentum of the gasses expelled from said engine portal.

13. The thrust enhancer of claim 12 wherein:
said auxiliary ejector further includes:
a flame holder assembly mounted in said auxiliary ejector duct.

14. The thrust enhancer of claim 13 wherein:
said exhaust end of said auxiliary ejector duct flares to form a diffuser.

15. The thrust enhancer of claim 13 wherein:
said primary air intake means directs intake air over the outside aft surface of said afterburner.

* * * * *